United States Patent
Elshafie et al.

(10) Patent No.: US 12,048,020 B2
(45) Date of Patent: Jul. 23, 2024

(54) MSGB WAVEFORM INDICATION

(71) Applicant: QUALCOMM Incorporated, San Diego, CA (US)

(72) Inventors: Ahmed Elshafie, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 17/454,889

(22) Filed: Nov. 15, 2021

(65) Prior Publication Data
US 2023/0156802 A1 May 18, 2023

(51) Int. Cl.
*H04W 74/0833* (2024.01)
*H04L 1/1812* (2023.01)
*H04W 74/00* (2009.01)

(52) U.S. Cl.
CPC ....... *H04W 74/0833* (2013.01); *H04L 1/1812* (2013.01); *H04W 74/006* (2013.01)

(58) Field of Classification Search
None
See application file for complete search history.

(56) References Cited

U.S. PATENT DOCUMENTS

| | | | |
|---|---|---|---|
| 10,439,789 B2* | 10/2019 | Brunel | H04L 5/1469 |
| 10,862,661 B2* | 12/2020 | Brunel | H04L 5/14 |
| 11,140,715 B2* | 10/2021 | Ly | H04W 74/0833 |
| 11,234,273 B2* | 1/2022 | Islam | H04W 56/001 |
| 11,489,655 B2* | 11/2022 | Brunel | H04L 5/1469 |
| 2013/0194956 A1* | 8/2013 | Sartori | H04W 24/02 370/252 |
| 2016/0018836 A1* | 1/2016 | Pawar | F24F 11/49 700/276 |
| 2016/0202180 A1* | 7/2016 | Rakic | G01N 21/45 250/341.1 |
| 2017/0033854 A1* | 2/2017 | Yoo | H04W 24/10 |
| 2017/0196002 A1* | 7/2017 | Sartori | H04W 74/0833 |
| 2018/0049167 A1* | 2/2018 | Islam | H04L 5/0023 |
| 2018/0116000 A1* | 4/2018 | Ly | H04W 74/006 |
| 2018/0124790 A1* | 5/2018 | Yerramalli | H04W 72/0453 |

(Continued)

OTHER PUBLICATIONS

International Search Report and Written Opinion—PCT/US2022/078793—ISA/EPO—Feb. 2, 2023.

*Primary Examiner* — Faiyazkhan Ghafoerkhan
(74) *Attorney, Agent, or Firm* — Norton Rose Fulbright US LLP

(57) ABSTRACT

This disclosure provides systems, methods, and devices for wireless communication that support RACH message waveform indication. In a first aspect, a method of wireless communication includes transmitting, by a wireless communication device, a random access control channel (RACH) request message; and receiving, by the wireless communication device, a RACH response message based on the RACH request message, wherein a waveform type of RACH response messages is dynamic, wherein the waveform type of the RACH response message is determined by the wireless communication device, and wherein transmitting the RACH request message and receiving the RACH response message comprise a two-step RACH procedure. Other aspects and features are also claimed and described.

30 Claims, 8 Drawing Sheets

(56) References Cited

U.S. PATENT DOCUMENTS

| | | | |
|---|---|---|---|
| 2018/0263027 A1* | 9/2018 | Sartori | H04W 74/0833 |
| 2018/0323947 A1* | 11/2018 | Brunel | H04L 5/1469 |
| 2018/0359740 A1* | 12/2018 | Sartori | H04L 5/0053 |
| 2019/0116500 A1* | 4/2019 | Bendlin | H04W 24/10 |
| 2020/0099502 A1* | 3/2020 | Brunel | H04L 27/36 |
| 2020/0100251 A1* | 3/2020 | Yerramalli | H04W 72/0453 |
| 2020/0107235 A1* | 4/2020 | Peisa | H04W 76/11 |
| 2020/0288506 A1* | 9/2020 | Lei | H04W 74/0833 |
| 2020/0314709 A1* | 10/2020 | Ly | H04W 36/00725 |
| 2020/0367284 A1* | 11/2020 | Lei | H04W 74/0808 |
| 2021/0119761 A1* | 4/2021 | Brunel | H04L 5/1469 |
| 2021/0329705 A1* | 10/2021 | Ljung | H04W 74/0833 |
| 2023/0156802 A1* | 5/2023 | Elshafie | H04W 74/006 370/329 |

* cited by examiner

MSGB WAVEFORM INDICATION

TECHNICAL FIELD

Aspects of the present disclosure relate generally to wireless communication systems, and more particularly, to RACH message waveform indication. Some features may enable and provide improved communications, including dynamic Message B waveform indication.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes transmitting, by a wireless communication device, a random access control channel (RACH) request message; and receiving, by the wireless communication device, a RACH response message based on the RACH request message, wherein a waveform type of RACH response messages is dynamic, wherein the waveform type of the RACH response message is determined by the wireless communication device, and wherein transmitting the RACH request message and receiving the RACH response message comprise a two-step RACH procedure.

In another aspect of the disclosure, an apparatus for wireless communication includes a processor; and a memory coupled to the processor, the memory storing instructions which when executed by the processor cause the processor to: transmit a random access control channel (RACH) request message; and receive a RACH response message based on the RACH request message, wherein a waveform type of RACH response messages is dynamic, wherein the waveform type of the RACH response message is determined by the apparatus, and wherein transmitting the RACH request message and receiving the RACH response message comprise a two-step RACH procedure.

In one aspect of the disclosure, a method for wireless communication includes receiving, by a wireless communication device, a random access control channel (RACH) request message; and transmitting, by the wireless communication device, a RACH response message based on the RACH request message, wherein a waveform type of RACH response messages is dynamic, and wherein the waveform type of the RACH response message is determined by the wireless communication device, and wherein receiving the RACH request message and transmitting the RACH response message comprise a two-step RACH procedure.

In another aspect of the disclosure, an apparatus for wireless communication includes a processor; and a memory coupled to the processor, the memory storing instructions which when executed by the processor cause the processor to: receive a random access control channel (RACH) request message; and transmit a RACH response message based on the RACH request message, wherein a waveform type of RACH response messages is dynamic, and wherein the waveform type of the RACH response message is determined by the apparatus, and wherein receiving the RACH request message and transmitting the RACH response message comprise a two-step RACH procedure.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
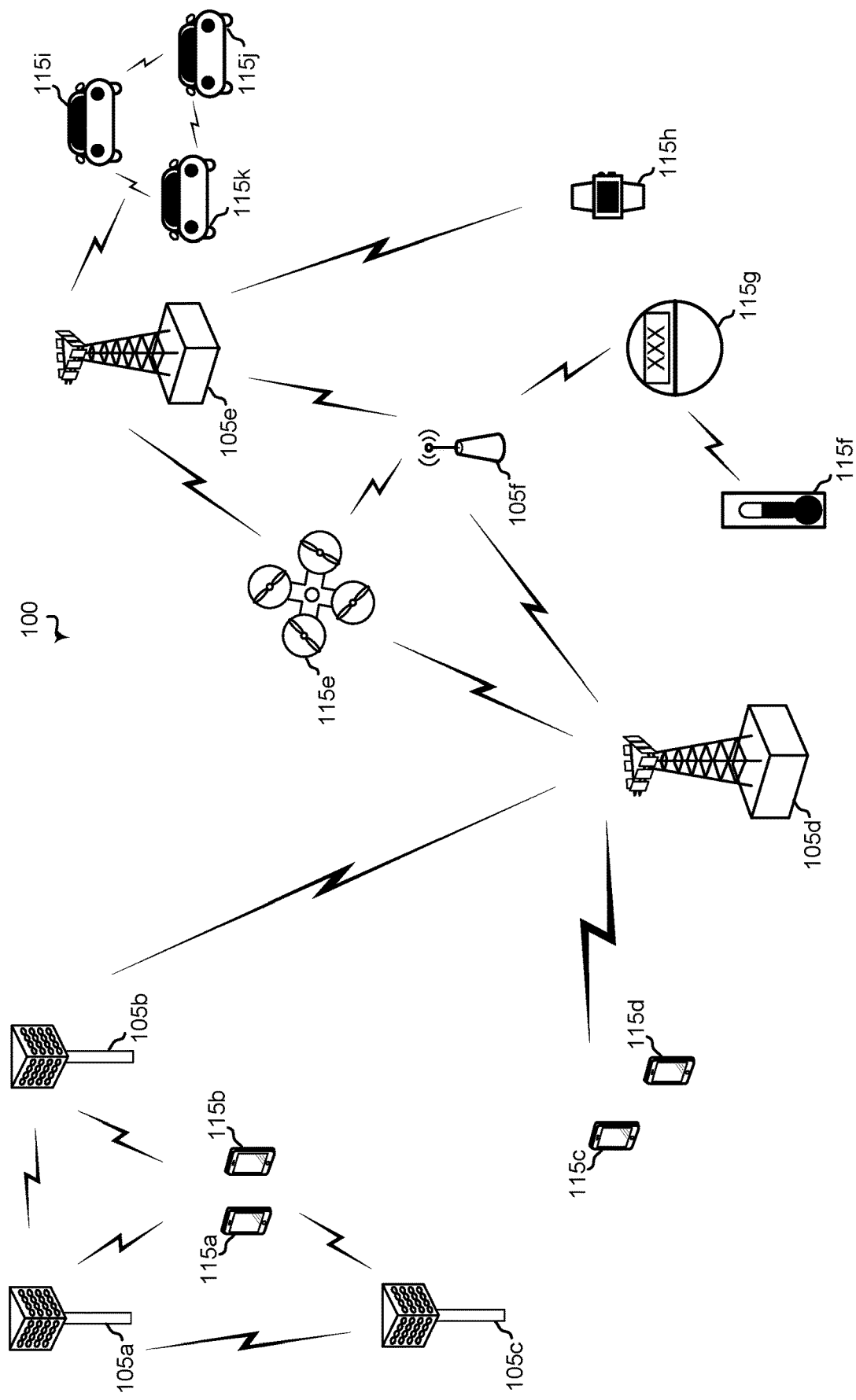
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-

115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
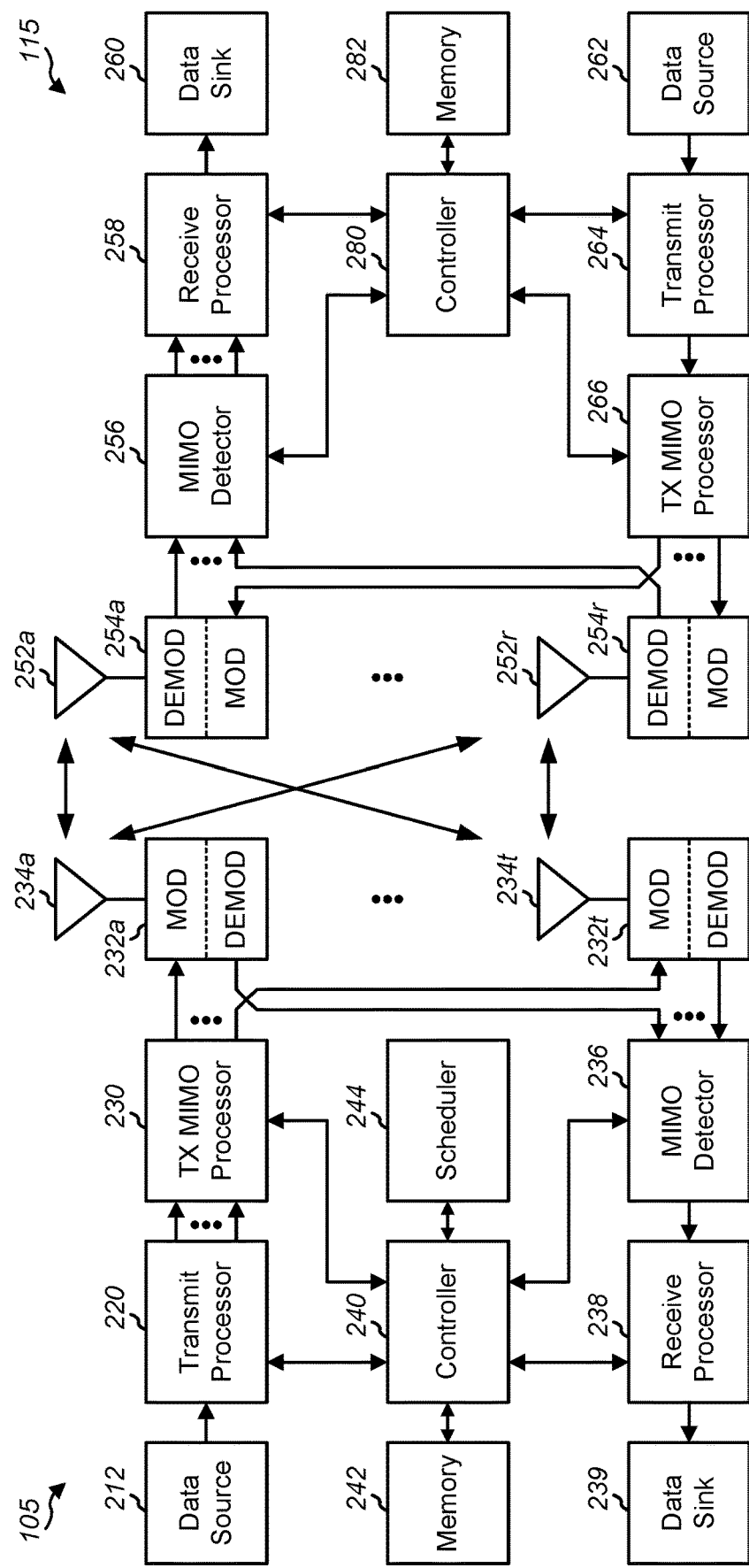
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6 and 7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
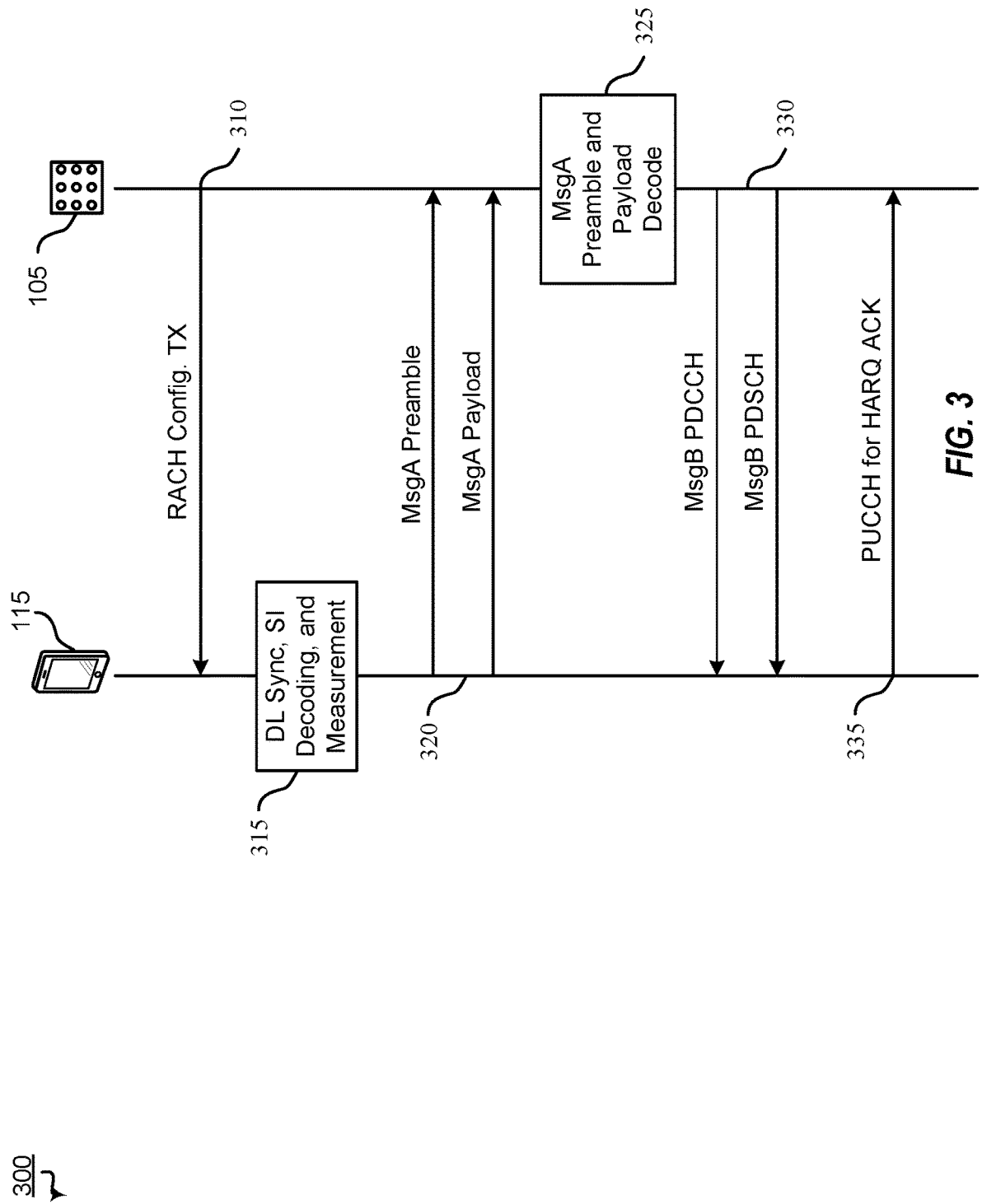
FIG. 3 is a ladder diagram illustrating an example of a two-step RACH operation.

FIG. 3 illustrates a ladder diagram 300 of an example of a two-step RACH procedure. The two-step RACH procedure is an abbreviated version of the four-step RACH procedure. The base four-step RACH procedure was specified in Release 15 (Rel-15), while 2-step RACH was introduced in Release 16 (Rel-16). In a conventional four-step RACH operations, two devices exchange four messages (two round-trip cycles) to complete the RACH procedure and operations. These messages of the four-step RACH procedure include a RACH request including a random access preamble, a random access response, a scheduled transmission, and a contention resolution transmission. These messages are often referred to Messages 1-4, such as Msg1, Msg2, Msg3, and Msg4. As an example, a conventional four-step RACH may occur on device power-up for the UE 115 to connect to the network, such as enter a RRC CONNECTED mode with a particular base station.

In a conventional two-step RACH operation, two devices exchange two message to complete the RACH procedure and operations in a single round-trip cycle. In the two-step RACH operation, the two messages are often referred to as Message A (MsgA) and Message B (MsgB). Message A includes messages 1 and 3 (Msg1 and Msg3) of the four-step RACH operation, and Message B include message 2 and 4 (Msg2 and Msg4) of the four-step RACH operation. Message A is the RACH request which includes preamble and data transmissions, and Message B is the RACH response which includes control and data transmissions. For example, Message A includes a physical RACH (PRACH) transmission (e.g., RACH preamble) and a PUSCH transmission (e.g., scheduled data transmission), and Message B includes a PDCCH transmission (e.g., RACH response) and a PDSCH transmission (e.g., contention resolution).

The RACH procedures (either two or four-step) may be supported by one or more additional messages. In some implementations, the RACH procedures includes additional messages of a setup message and a feedback message. For example, the setup message may include or correspond to a system message or higher layer message (e.g., layer 3 message) which provides the device (e.g., UE 115) information (e.g., timing/synchronization information) in which to start the RACH process, such as to generate and transmit the Message 1 or Message A. Additionally, or alternatively, the feedback message may include RACH feedback for the network, and such feedback may be transmitted after the last message of the RACH operation.

Two-step RACH operations may be used with or offer advantages over four-step RACH for 1) transitions from a RRC IDLE/INACTIVE state to a RRC CONNECTED state; 2) small data transmissions in the RRC IDLE/INACTIVE state; 3) handovers from a source cell to a target cell in the RRC CONNECTED state; and 4) recovering from UE uplink synchronization loss in the RRC CONNECTED state. These advantages include reduced latency and signaling overhead.

An example illustration of two-step RACH operations are illustrated in the ladder diagram 300 of FIG. 3. During operation, at 310, a base station 105 (e.g., gNB) transmits a system message to a UE 115. As illustrated in FIG. 3, in some implementations the system message may be a higher layer transmission and may include or correspond to a synchronization signal block (SSB) message, a system information block (SIB) message, a reference signal (RS), or RRC message. In a particular implementation, the system message is sent to the UE 115 while the UE 115 is in a connected state, such as an RRC CONNECTED state. In other implementations, the system message is sent to the UE 115 while the UE 115 is in a non-connected state, such as an RRC IDLE or INACTIVE state.

At 315, the UE 115 receives and processes the system message from the base station 105. In some implementations, the UE 115 extracts configuration information from the system message and uses the configuration information to perform downlink synchronization operations, decode messages (e.g., SI messages), perform measurement operations, or a combination thereof.

At 320, the UE 115 transmits a PRACH preamble and a payload, also known as MsgA, to the base station 105. In a two-step RACH operation, the reduction in round-trip cycles and latency is achieved by combining the preamble (Msg1) and the scheduled PUSCH transmission (Msg3) of a four-step RACH operation into a single message (MsgA) from the UE 115.

At 325, the base station 105 receives and processes the PRACH preamble and the payload of MsgA. For example, the base station 105 may process or decode the preamble based on receiving a signal corresponding to the MsgA, and may then process the payload portion based on detecting or decoding the preamble portion.

At 330, the base station 105 transmits a PDDCH and a PDSCH to the UE 115, also known as MsgB, responsive to the MsgA. For example, after processing the payload and extracting data and/or RACH information, the base station 105 may generate a RACH response message, MsgB. In conventional operations, the waveforms, i.e. a waveform type, of the portions of MsgB are the same and are static. That is, the waveform type is set by a network or standard and does not change based on any parameter. In the aspects described herein, a waveform type, or types, of RACH messages is/are dynamic and can be adjusted to offer enhanced performance. The aspects described herein include indication schemes and signaling for indicating the dynamic waveform type of RACH messages, such as downlink type message of a two-step RACH process, i.e., MsgB. The successful reception and decoding of the MsgB completes the two-step RACH procedure.

At 335, the UE 115 transmits a feedback message based on the MsgB or RACH process. For example, the UE 115 transmits a PUCCH transmission including feedback information for the MsgB and/or two-step RACH operation. In a particular implementation, the PUCCH transmission may be a HARQ feedback transmission and may include HARQ ACK feedback.

In 5G, multiple types of waveforms may be utilized according to operating conditions and bandwidth. In particular multiple different types of waveforms may be utilized for downlink communications. Examples of these waveform types include single-carrier waveforms and multiple-carrier waveforms (also referred to as multi-carrier waveforms). These waveform types may include time-domain waveforms and frequency domain waveforms. As illustrative non-limiting examples, the waveform type may include or correspond to a cyclic prefix orthogonal frequency division multiplex (CP-OFDM) waveform, a discrete Fourier transform spread orthogonal frequency division multiplex (DFT-s-OFDM) waveform, or a single-carrier quadrature amplitude modulation (SC-QAM) waveform. Each of these waveforms or waveform categories have benefits as compared to the others. For example, frequency domain waveform implementations and/or DFT-s-OFDM waveform implementations allow for more flexible and efficient bandwidth allocation and enable easier support of larger bandwidths. As another example, single carrier, time-domain, and/or SC-QAM waveform implementations may offer lower complexity and power usage.

However, conventional RACH operations have no way of adjusting a waveform type to take advantage of different waveform types to optimize the waveform type to the operating or channel conditions. For example, the RACH waveforms cannot be adjusted to enable power efficient operations in some operating scenarios and to enable increased or flexible bandwidth allocation in other operating scenarios.

In the aspects described herein, wireless communication devices may perform dynamic RACH operation waveform indication. That is, the devices may utilize different waveform types to perform RACH operations to benefit from potential enhanced performance when optimizing the waveform type for the particular channel characteristics and bandwidth or operating condition. To enable dynamic waveform selection for RACH operations, the devices may determine and/or signal a waveform type or types to be used for RACH operations. The devices may utilize one or more techniques for determining and/or signaling a waveform type. In some implementations, the waveform type (or types) may be preset or configured. For example, one or more waveform types may be configured by a network or region and stored in memory, or the one or more waveform types may be configured by system message, such as a by RRC on system startup or connection. The preset waveform types may be indicated by or associated with conditions. For example, preset waveform information may indicate multi-carrier waveforms when one or more conditions are met. To illustrate, for lower bands (e.g., <60 GHz) multi-carrier waveforms (e.g., CP-OFDM) may be used. Additionally, or alternatively, the preset waveform information may indicate single-carrier waveforms when one or more conditions are not met, when one or more second conditions are met, or both. To illustrate, for higher bands (e.g., >60 GHz) and/or power efficient operations single-carrier waveforms may be used.

In some implementations, the waveform type may be indicated by or determined based on a type of waveform of a previous message. For example, a waveform type of one or more RACH messages of the RACH operations may be the same as a waveform type of a portion of a previous message from the network. To illustrate, the waveform type of the RACH request and/or response may be the same as a PDCCH waveform type of a previous SIB1 message, the same as a PDSCH waveform type of a previous SIB1 message, or the same as a waveform type of a previous RACH message (e.g., MsgA).

In other implementations, a waveform of the MsgB is different from the waveform of the SIB1. In some other implementations, a waveform of the MsgB is different from the waveform of a different system message or multiple indications can be used. To illustrate, a first waveform type of a first portion of the MsgB is based on (e.g., the same as) a waveform type of the SIB1 and a second waveform type of a second portion of the MsgB is based on (e.g., the same as) a waveform type of another system message or the RACH request (e.g., MsgA).

Additionally, or alternatively, the waveform type may be indicated by a previous message. For example, the SIB1 message may include one or more indicators (e.g., waveform type indicators or RACH indicators) which are configured to signal a type of waveform for one or more portions of the RACH messages. To illustrate, the SIB1 message (or another message) may include an indicator which signals a waveform type of the PDDCH, the PDSCH, or both of MsgB.

As yet another example, a waveform of a first portion of MsgB is set (e.g., static) or otherwise signaled (e.g., dynamic). and the first portion of MsgB (e.g., PDDCH) indicates a waveform of the second portion (e.g., PDSCH) of MsgB. For example, the waveform of the first portion may indicate the waveform type of the second portion or the first portion may include an indicator which signals the waveform type of the second portion.

Although some examples are described above, they are illustrative and not exhaustive. Additionally, the examples may be combined with each other. For example, in a particular implementations, a first waveform type of a first portion of a RACH message may be indicated by a previous message and a second waveform type of a second portion of the RACH message may be indicated by the first portion of the RACH message.

The aspects described herein enable RACH operations with dynamic waveform type enhancements and include various indication and signaling schemes for waveform indication in dynamic waveform RACH operations. Enhanced dynamic waveform RACH operations may enable RACH operations to take advantage of additional waveform types to improve wireless communications. The improvements may include increased throughput, increased bandwidth utilization, reduced latency, reduced overhead signaling, reduced errors/dropped connections, etc.

Figure 4:
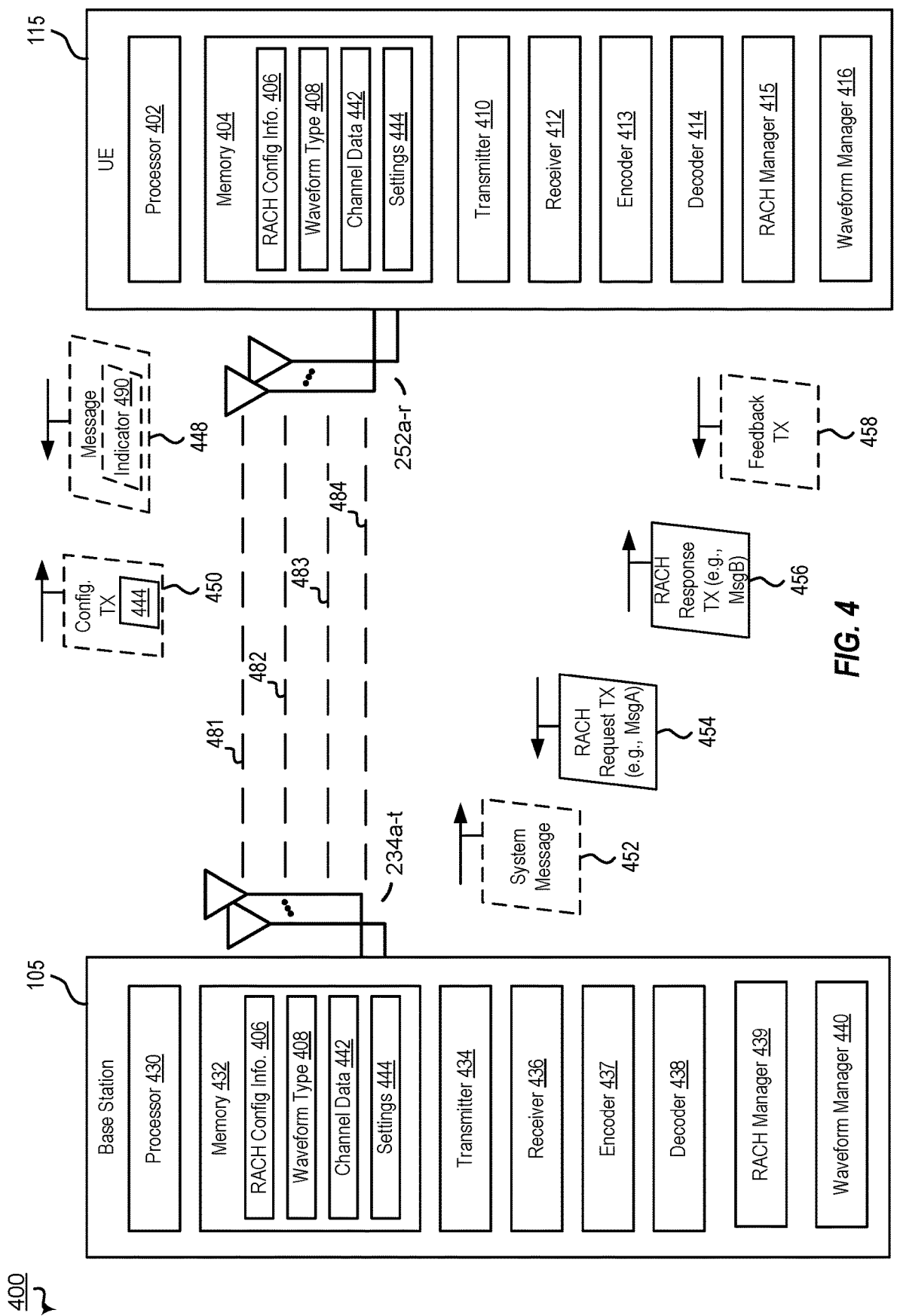
FIG. 4 is a block diagram illustrating an example wireless communication system that supports RACH message waveform indication according to one or more aspects.

FIG. 4 illustrates an example of a wireless communications system 400 that supports RACH message waveform indication operations in accordance with aspects of the present disclosure. RACH message waveform indication may enable dynamic waveform use for RACH operations and enhanced operations. For example, downlink communications in RACH operations (e.g., MsgB) may utilize different waveform types for operational efficiencies. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105 and a UE 115. Use of RACH message waveform indication operations may improve two-step RACH operations. Improved two-step RACH operations may reduce latency and increase throughput by optimizing waveform type usage. Thus, network and device performance can be increased.

UE 115 and base station 105 may be configured to communicate via frequency bands, such as FR1 having a frequency of 410 to 7125 MHz, FR2 having a frequency of 24250 to 52600 MHz for mm-Wave, and/or one or more other frequency bands. It is noted that Sub-carrier spacing (SCS) may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated using Medium Access Control (MAC) Control Element (MAC CE) transmissions, Radio Resource Control (RRC) transmissions, sidelink control information (SCI) transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, RACH manager 415, waveform manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store RACH configuration information data 406, waveform type data 408, channel data 442, settings data 444, or a combination thereof, as further described herein.

The RACH configuration information data 406 includes or corresponds to data associated with or corresponding to data for configuring RACH operations. The RACH configuration information data 406 may indicate and/or enable determination of a particular type of RACH operation, such as two or four-step RACH procedures, between static or dynamic waveform type procedures, or both. In some implementations, the RACH configuration information data 406 may include or correspond to a particular type of dynamic waveform indication, such as by implicit or explicit signaling or by pre-configuration. Additionally, the RACH configuration information data 406 may enable performance of RACH operations, such a RACH determination or triggering operations, RACH timing determination, RACH operation evaluation, RACH message generation, etc.

The waveform type data 408 includes or corresponds to data associated or corresponding to waveform types. The waveform type data 408 may indicate waveform categories, such as single or multi-carrier or time or frequency-domain waveforms or may indicate a particular type of waveform, such as SC-QAM. Additionally, the waveform type data 408 may indicate a condition or conditions for selecting or prioritizing a waveform type category or a particular waveform type. In a particular implementation, the waveform type data 408 includes waveform types for different RACH messages or portions of RACH message. For example, the waveform type data 408 includes waveform type information for DL RACH messages. As another example, the waveform type data 408 includes first waveform type information for a first portion (e.g., PDCCH) of a RACH message and second waveform type information for a second portion (e.g., PDSCH) of the RACH message.

The channel data 442 includes or corresponds to data associated channel parameters and conditions of the link between the UE 115 and the base station 105. The channel data 442 may include current channel information, historical channel information, or a combination thereof. The channel information may include quality information, power information, bandwidth information, frequency information, etc., or a combination thereof.

The settings data 444 includes or corresponds to data associated with dynamic RACH waveform type indication operations. The settings data 444 may include settings and/or conditions data for determination, indication, or signaling procedures for dynamic RACH waveform type indication operations, such as waveform type signaling operations. The settings data 444 may include different waveform type signaling schemes and conditions or triggers for implementing particular signaling schemes.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. RACH manager 415 may be configured to determine and perform RACH operations, including RACH operation trigger determination, RACH type selection, RACH timing determination, RACH transmission generation, or a combination thereof. For example, RACH manager 415 is configured to perform RACH operations using dynamic waveform type. As an illustrative example of trigger determination operations, the RACH manager 415 may determine when to perform RACH operations based on one or more conditions. To illustrate, the RACH manager 415 may determine to initiate RACH operations responsive to a transition from the RRC IDLE/INACTIVE state to the RRC CONNECTED state, a small data transmission in the RRC IDLE/INACTIVE state, a handover in the RRC CONNECTED state, or uplink synchronization loss or recovery in the RRC CONNECTED state. As an illustrative example RACH type selection operations, the RACH manager 415 may determine two use two-step RACH operations with dynamic waveform type indication based on one or more conditions (e.g., the conditions above). As an illustrative example of timing and generating operations, the RACH manager 415 may receive or process RACH configuration information to determine a timing of RACH transmissions and for generating RACH transmissions, such as a RACH request, and optionally RACH feedback.

Waveform manager 416 may be configured to perform waveform type operations. For example, waveform manager 416 is configured to perform dynamic waveform type determination and indication operations. To illustrate, waveform manager 416 may determine a particular waveform type or types to be used in RACH operations. As another illustration, the waveform manager 416 may indicate or communicate a particular waveform type or types to be used in RACH operations by implicit or explicit signaling. Implicit signaling may include signaling a waveform type using a waveform type of another message. Explicit signaling may include including a particular waveform type indicator in a message, or indicating waveform type determination/selection criteria in a prior message.

Base station 105 includes processor 430, memory 432, transmitter 434, receiver 436, encoder 437, decoder 438, RACH manager 439, waveform manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store RACH configuration information data 406, waveform type data 408, channel data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. RACH manager 439 may include similar functionality as described with reference to RACH manager 415. Waveform manager 440 may include similar functionality as described with reference to waveform manager 416.

During operation of wireless communications system 400, base station 105 may determine that UE 115 has dynamic waveform RACH operation capability. For example, base station 105 or UE 115 may transmit a message 448 that includes a dynamic waveform RACH capability indicator 490. Indicator 490 may indicate dynamic waveform RACH operation capability or a particular type or mode of dynamic waveform RACH operations. In some implementations, a base station 105 sends control information to indicate to UE 115 that dynamic waveform RACH operations and/or a particular type of dynamic waveform RACH operations are to be used. For example, in some implementations, message 448 (or another message, such as configuration transmission 450) is transmitted by the base station 105. The configuration transmission 450 may include or indicate to use dynamic waveform RACH operations or to adjust or implement a setting of a particular type of dynamic waveform RACH operations. For example, the configuration transmission 450 may include settings data 444, as indicated in the example of FIG. 4, in addition to or in the alternative of the RACH configuration information data 406 and/or the waveform type data 408.

During operation, devices of wireless communications system 400, perform dynamic waveform RACH operations. For example, the base station 105 and the UE 115 perform dynamic waveform indication for two-step RACH operations. As another example, the base station 105 and the UE 115 perform dynamic waveform RACH operations for four-step RACH operations.

In the example of FIG. 4, the base station 105 generates and transmits a system message 452. The system message 452 may be a higher layer transmission and may include or correspond to a SSB, a SIB, a RS, or a RRC message. The base station 105 generates the system message 452 which includes or indicates the RACH configuration information 406. The RACH configuration information 406 may include timing information for the performance of RACH operations. In some implementations, the system message 452 may further include waveform type information (e.g., waveform type data 408). For example, in some such implementations the waveform type information may be explicitly communicated by an indicator which is included in the system message 452. As another example, the waveform type information may be implicitly communicated and a waveform type (e.g., first waveform type) of the system message 452 may indicate a waveform type (e.g., second waveform type) of a RACH message (or portion thereof).

The UE 115 receives the system message 452 from the base station 105 and determines the RACH configuration information 406. With the RACH configuration information 406, the UE 115 may process this information, such as described with reference to 315 of FIG. 3, to enable performance of a RACH operation. An example of a two-step RACH operation is illustrated in FIG. 4, by the communication of the RACH request transmission 454 and the RACH response transmission 456.

Responsive to determining to perform a RACH operation, the UE 115 may generate and transmit the RACH request transmission 454. The RACH request transmission 454 may include or correspond to MsgA, such as described with reference to FIG. 3 and further with respect to FIG. 5.

The network (e.g., the base station 105) may receive the RACH request transmission 454 and may generate and transmit a RACH response transmission 456 in response. The RACH response transmission 456 may include or correspond to MsgB, such as described with reference to FIG. 3 and further with respect to FIG. 5. In some implementations, the RACH response transmission 456 includes the waveform type data 408, such as by a waveform indicator. The waveform indicator may be included in a first portion (e.g., PDCCH) of the RACH response transmission 456 and may indicate a waveform type of a second portion (e.g., PDSCH) of the RACH response transmission 456.

In communicating the RACH request transmission 454, RACH response transmission 456, or both, the UE 115 and base station 105 may determine a waveform type or types to be used for such transmissions. That is, the UE 115 and base station 105 may determine and optionally signal the waveform type or types to each other. As described with reference to FIG. 3, the waveforms types could be preset during RRC messages when connected or could be associated with preset conditions and then the conditions are evaluated during RACH operations to select a suitable or optimized waveform type. Additionally, the waveform type or types could be indicated by explicit indicator in preceding system message. Alternatively, the waveform type or types could be indicated implicitly by a waveform type of a preceding message. The waveform type of a second portion of a RACH message may be singled by a prior portion of the RACH message in addition to or in the alternative off the example signaling schemes noted above.

The UE 115 (e.g., the RACH manager 415) may receive the RACH response transmission 456 and determine if the RACH request was successful (e.g., if the scheduled data transmission of the RACH request was received and processed successfully). The UE 115 may generate feedback information based on the RACH response transmission 456 or receiving the RACH response transmission 456. The feedback information may indicate receipt and/or successfully decoding of the RACH response transmission 456. After receiving the RACH response transmission 456 and generating the feedback information, the UE 115 may generate and transmits a feedback transmission 458.

Accordingly, the UE 115 and the base station 105 may be able to more effectively perform RACH operations by utilizing dynamic waveform type. Thus, FIG. 4 describes enhanced RACH operations and dynamic waveform type indication operations for wireless communication devices. Performing enhanced RACH operations or dynamic waveform type indication enables improved connection operations and thus, enhanced UE and network performance by increasing throughput and reducing errors and latency.

Figure 5:
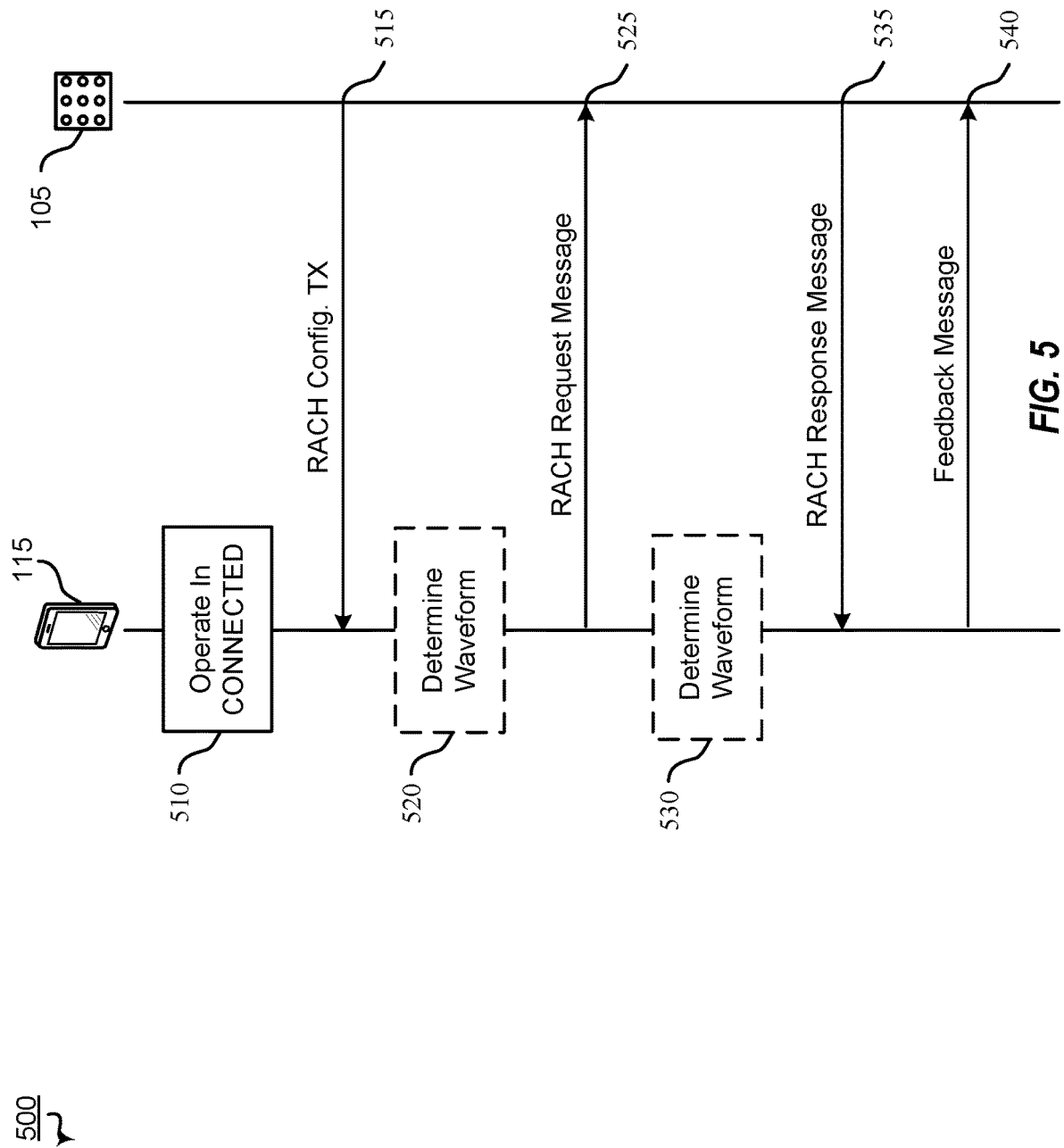
FIG. 5 is a ladder diagram illustrating an example wireless communication system that supports RACH message waveform indication according to one or more aspects.

FIG. 5 illustrates a ladder diagrams of an example wireless communication system that supports RACH message waveform indication according to one or more aspects. The example of FIG. 5 includes similar devices to the devices described in FIGS. 1, 2, and 4, such as UE 115 and base station 105. The devices, such as UE 115 and base station 105, of FIG. 5 may include one or more of the components as described in FIGS. 2 and 4. In FIG. 5, these devices may utilize antennas 252a-r, transmitter 410, receiver 412, encoder 413 and/or decoder 414, or may utilize antennas 234a-t, transmitter 434, receiver 436, encoder 437 and/or decoder 438 to communicate transmissions and receptions.

Referring to FIG. 5, FIG. 5 is a ladder diagram 500 of dynamic waveform type indication for a downlink message for two-step RACH operations. Although the example illustrated in FIG. 5 depicts a UE 115 and a network entity, such as base station 105. In other implementations, the operations may occur between two wireless communication devices, such as two UEs and over sidelink communications.

At 510, the UE 115 operates in a RRC CONNECTED state. For example, the UE 115 is connected to the base station 105 (such as a gNB), and the base station 105 is a serving cell for the UE 115. The UE 115 may communicate with the base station 105 and transmit data to and/or receive data from the base station 105. Additionally, or alternatively, the base station 105 may coordinate sidelink operations for the UE 115.

At 515, the base station 105 transmits a RACH configuration transmission to the UE 115. For example, the RACH manager 439 of the base station 105 generates and transmits a system or RACH configuration message (e.g., configuration transmission 450 or system message 452) to the UE 115 which includes the RACH information (e.g., RACH configuration information 406) and optionally waveform information (e.g., waveform type data 408). The RACH information (e.g., RACH configuration information 406) may include information for performing the RACH operations and optionally for indicating a waveform type to be used for RACH operations. The RACH configuration transmission may include or correspond to a higher layer message, such as a layer 3 message. For example, the base station 105 generates a SIB1 or RRC message which indicates or includes the RACH information. In some implementations, the RACH configuration transmission is sent to multiple UEs, that is a broadcast or groupcast transmission. In other implementations, the RACH configuration transmission is unicast transmission, a PDCCH transmission, such as a DCI, or a MAC CE, or a sidelink transmission.

As illustrated in the example of FIG. 5, the UE 115 is in a connected state (e.g., RRC CONNECTED) when it receives the RACH configuration transmission. In some such implementations, the UE 115 transitions to a RRC IDLE or INACTIVE state at some time after reception of the RACH configuration transmission. Alternatively, in other implementations the UE 115 transitions to a RRC IDLE or INACTIVE state prior to reception of the RACH configuration transmission and is in a RRC IDLE or INACTIVE state when the RACH configuration transmission is transmitted.

At 520, the UE 115 optionally determines a waveform type (e.g., first waveform type) based on the RACH configuration transmission. For example, the waveform manager 416 of the UE 115 determines a particular waveform type based on the RACH information in the RACH configuration transmission. To illustrate, the waveform manager 416 of the UE 115 determines the particular waveform type based on an indicator in the RACH configuration transmission. As another example, the waveform manager 416 of the UE 115 determines the particular waveform type based on a waveform type of the RACH configuration transmission. As yet another example, the waveform manager 416 of the UE 115 determines the particular waveform type based on RACH information and operating conditions. To illustrate, the waveform manager 416 of the UE 115 selects a particular waveform type form a data structure of waveform types for RACH operations based on bandwidth, frequency band, channel, peak-to-average power ratio (PAPR), power settings, region, etc., or a combination thereof.

At 525, the UE 115 transmits a RACH request message to the base station 105. For example, the RACH manager 415 of the UE 115 generates and transmits a RACH request message to the base station 105 to initiate RACH operations. The RACH request message may include or correspond to the RACH request transmission 454 of FIG. 4. In some implementations, the RACH request message may include or correspond to MsgA of a two-step RACH procedure. To illustrate, the RACH request message may include two messages or signals, such as a RACH preamble and scheduled data transmission (e.g., PUSCH transmission). In some implementations where the UE 115 optionally determines a waveform type at 520, the UE 115 may determine the waveform type for the RACH request message and generate and transmit the RACH request based on the determined waveform type.

At 530, the UE 115 optionally determines a waveform type (e.g., second waveform type) based on the RACH configuration transmission, a RACH response, or a combination thereof. For example, the waveform manager 416 of the UE 115 determines a particular waveform type based on the RACH information in the RACH configuration transmission. To illustrate, the waveform manager 416 of the UE 115 determines the particular waveform type based on an indicator in the RACH configuration transmission. As another example, the waveform manager 416 of the UE 115 determines the particular waveform type based on a waveform type of the RACH configuration transmission or the RACH response message. As yet another example, the waveform manager 416 of the UE 115 determines the particular waveform type based on RACH information and operating conditions. To illustrate, the waveform manager 416 of the UE 115 selects a particular waveform type form a data structure of waveform types for RACH operations based on bandwidth, frequency band, channel, PAPR, power settings, region, etc., or a combination thereof.

At 535, the base station 105 transmits a RACH response message to the UE 115. For example, a RACH manager of the base station 105 generates and transmits a RACH response message to the UE 115 to complete RACH operations. The RACH response message may include or correspond to the RACH response transmission 456 of FIG. 4. In some implementations, the RACH response message may include or correspond to MsgB of a two-step RACH procedure. To illustrate, the RACH response message may include two messages or signals, such as a control portion (e.g., PDCCH) and a data portion (e.g., PDSCH). In some implementations where the UE 115 determines a waveform type at 520, determines a waveform type at 535, or both, the UE 115 may determine the waveform type for the RACH response message and receive and process the RACH response based on the determined waveform type.

Although the determination of a waveform type at 530 is shown as prior to receiving the RACH response message at 535, in some implementations, such as when the determination is based on the RACH response message, the determination of the waveform type at 530 occurs during or after reception of the RACH response message at 535. For example, a waveform type of a second portion (e.g., PDSCH) of the RACH response message may be indicated by or based on a first portion (e.g., PDCCH) of the RACH response message. To illustrate, an indicator in the first portion may signal a waveform type of the second portion (e.g., PDSCH) or a first waveform type of the first portion (e.g., PDSCH) may indicate (e.g., be the same as) a second waveform type of the second portion (e.g., PDSCH).

In some implementations, the UE 115 receives the RACH response message and generates feedback based on the RACH response message. At 540, the UE 115 generates and transmits a feedback message to the base station 105. For example, the RACH manager 415 of the UE 115 generates and transmits a HARQ feedback message to the base station 105 indicating HARQ feedback for the RACH response message.

Thus, in the example in FIG. 5, the wireless communication devices perform dynamic waveform RACH operations. The devices further perform waveform type indication to enable dynamic waveform RACH operation. Although the example in FIG. 5 is directed to downlink dynamic waveform indication, in other examples, uplink dynamic waveform indication may be used in addition to or in the alternative of. Similarly, although the example in FIG. 5 is directed to two-step RACH operations and UL/DL operations (e.g., UE/gNB operations, in other examples, four-step RACH operations may be used in addition to or in the alternative of two-step RACH operations and/or sidelink operations (e.g., device-to-device communications) may be used in addition to or in the alternative of UL/DL operations.

Additionally, or alternatively, one or more operations of FIGS. 3-5 may be added, removed, substituted in other implementations. For example, in some implementations, one or more of the example steps of FIGS. 4 and 5 may be used together.

Figures 6, 7:
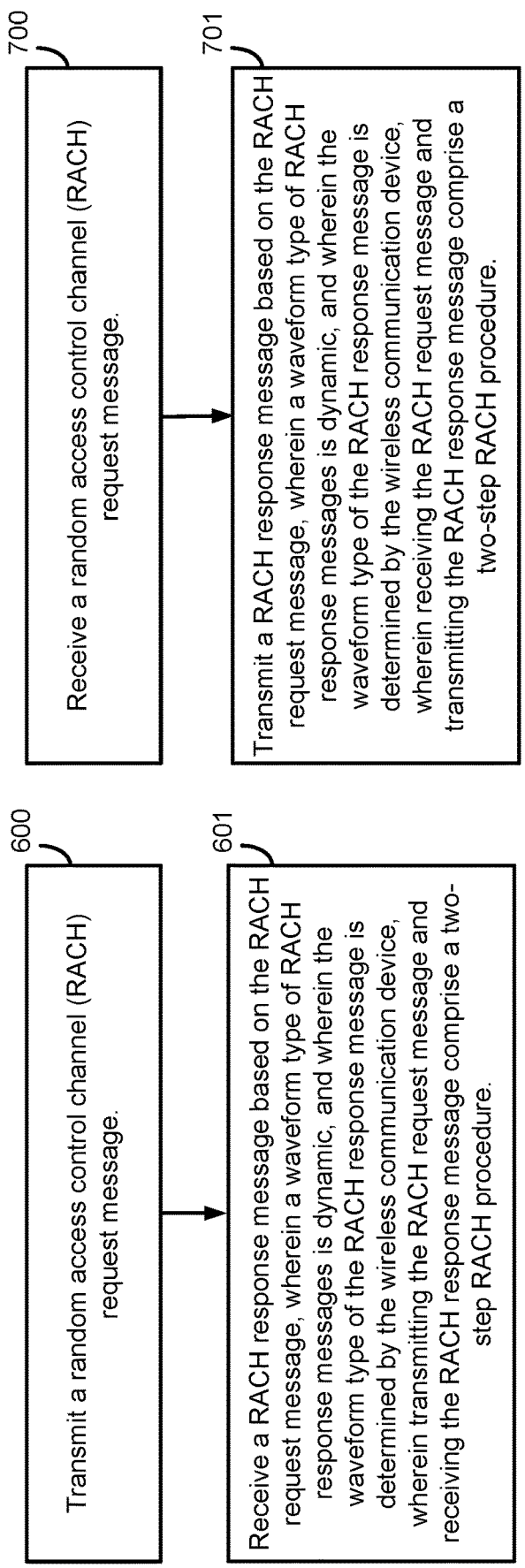
FIG. 6 is a flow diagram illustrating an example process that supports RACH message waveform indication according to one or more aspects.
FIG. 7 is a block diagram of an example UE that supports RACH message waveform indication according to one or more aspects.
Figure 8:
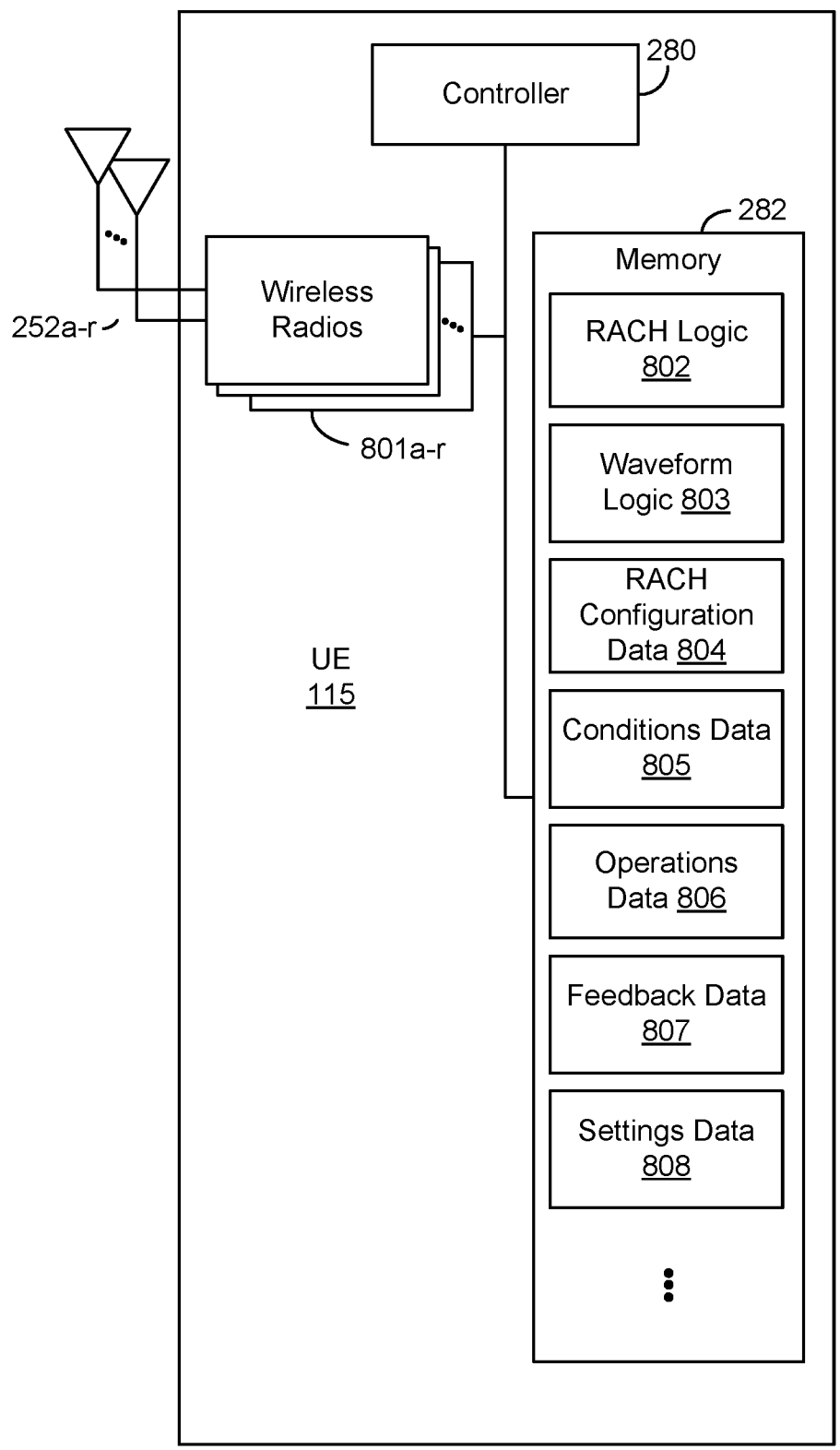
FIG. 8 is a flow diagram illustrating an example process that supports RACH message waveform indication according to one or more aspects.

FIG. 6 is a flow diagram illustrating example blocks executed by a wireless communication device (e.g., a UE or base station) configured according to an aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 8, memory 282 stores RACH logic 802, waveform logic 803, RACH configuration data 804, conditions data 805, operations data 806, feedback data 807, and settings data 808. The data (802-808) stored in the memory 282 may include or correspond to the data (406, 408, 442, 444) stored in the memory 404 of FIG. 4.

At block 600, a wireless communication device, such as a UE, transmits a random access control channel (RACH) request message. For example, the UE 115 transmits the RACH request transmission 454 of FIG. 4 or the RACH request message of FIG. 5, as described with reference to FIGS. 4 and 5. To illustrate, a transmitter (e.g., transmit processor 220 or transmitter 410) of the UE 115 transmits the RACH request transmission 454, including the RACH configuration information 406, via wireless radios 801*a-r* and antennas 252*a-r*. The RACH request transmission 454 may include or correspond to MsgA and include a RACH preamble and a scheduled data transmission, as described with reference to FIGS. 3-5. The UE 115 may optionally determine a waveform type of the RACH request message based on the RACH request or a prior system message, such as by an indicator included therein or based on a waveform type of such message. Additionally, or alternatively, the UE 115 may determine the waveform type on operating conditions, such as a frequency range, frequency band, channel, bandwidth, etc., channel conditions, such as congestion, signal strength, channel quality, etc., or a combination thereof.

At block 601, the UE 115 receives a RACH response message based on the RACH request message, wherein a waveform type of RACH response messages is dynamic, and wherein the waveform type of the RACH response message is determined by the wireless communication device. For example, the UE 115 receives the RACH response transmission 456 of FIG. 4 or the RACH response message of FIG. 5 from the base station 105, as described with reference to FIGS. 4 and 5. To illustrate, a receiver (e.g., receive processor 258 or receiver 412) of the UE 115 receives the RACH response transmission 456 via wireless radios 801*a-r* and antennas 252*a-r* for completing a two-step RACH procedure. The RACH response transmission 456 may include or correspond to MsgB and include a PDCCH and a PDSCH, as described with reference to FIGS. 3-5. The UE 115 may determine a waveform type of the RACH response message based on the RACH request, the RACH response, or a prior system message, such as by an indicator included therein or based on a waveform type of such message. Additionally, or alternatively, the UE 115 may determine the waveform type on operating conditions, such as a frequency range, frequency band, channel, bandwidth, etc., channel conditions, such as congestion, signal strength, channel quality, etc., or a combination thereof. Transmitting the RACH request message and receiving the RACH response message comprise a two-step RACH procedure.

The wireless communication device (e.g., UE or base station) may execute additional blocks (or the wireless communication device may be configured further perform additional operations) in other implementations. For example, the wireless communication device (e.g., the UE 115) may perform one or more operations described above. As another example, the wireless communication device (e.g., the UE 115) may perform one or more aspects as presented below.

In a first aspect, the UE 115 further: determines the waveform type of the RACH response message; and processes a waveform of the RACH response message based on the determined waveform type.

In a second aspect, alone or in combination with the first aspect, determining the waveform type of the RACH response message includes: determining the waveform type of at least a portion of the RACH response message based on network settings (e.g., band, bandwidth, network or region configuration, etc.), a SIB1 message (e.g., waveform or indicator thereof), the RACH response message (e.g., waveform or indicator thereof), or a combination thereof.

In a third aspect, alone or in combination with one or more of the above aspects, the UE 115 further: receives a higher layer message indicating RACH configuration information (e.g., timing information and optionally waveform type information or indication), wherein the higher layer message comprises a SSB message, a SIB message, a RS message, or a RRC message.

In a fourth aspect, alone or in combination with one or more of the above aspects, the UE 115 further: transmits feedback transmission based on and responsive to the RACH response.

In a fifth aspect, alone or in combination with one or more of the above aspects, the feedback transmission comprises a PUCCH transmission, and wherein the feedback transmission includes HARQ feedback corresponding to the RACH response.

In a sixth aspect, alone or in combination with one or more of the above aspects, the UE 115 further: switches from an idle or standby mode to a connected mode based on the feedback transmission (OR response thereto); and operates in the connected mode.

In a seventh aspect, alone or in combination with one or more of the above aspects, the RACH request comprises a message A transmission and includes a Message A preamble and a Message A payload, wherein the RACH response comprises a Message B transmission and includes a Message B PDCCH and a Message B PDSCH.

In an eighth aspect, alone or in combination with one or more of the above aspects, the two-step RACH procedure is performed in response to a transition from a RRC IDLE/INACTIVE state to a RRC CONNECTED state, a small data transmission in the RRC IDLE/INACTIVE state, a handover in the RRC CONNECTED state, or an uplink synchronization loss in the RRC CONNECTED state.

In a ninth aspect, alone or in combination with one or more of the above aspects, the Message B PDCCH comprises a first waveform type and the Message B PDSCH comprises a second waveform type.

In a tenth aspect, alone or in combination with one or more of the above aspects, the waveform type comprises a frequency-domain waveform.

In an eleventh aspect, alone or in combination with one or more of the above aspects, the waveform type comprises a time-domain waveform.

In a twelfth aspect, alone or in combination with one or more of the above aspects, the waveform type comprises a single carrier waveform.

In a thirteenth aspect, alone or in combination with one or more of the above aspects, the single carrier waveform comprises a discrete Fourier transform spread orthogonal frequency division multiplexing (DFT-s-OFDM) waveform or a Single-Carrier Quadrature Amplitude Modulation (SC-QAM) waveform.

In a fourteenth aspect, alone or in combination with one or more of the above aspects, the waveform type comprises a multi-carrier waveform.

In a fifteenth aspect, alone or in combination with one or more of the above aspects, the multi-carrier waveform comprises a cyclic prefix (CP) orthogonal frequency division multiplexing (OFDM, CP OFDM) waveform.

In a sixteenth aspect, alone or in combination with one or more of the above aspects, the UE 115 further: retrieves the waveform type from memory.

In a seventeenth aspect, alone or in combination with one or more of the above aspects, the UE 115 further: determines the waveform type based on one or more thresholds, wherein determining the waveform type based on one or more thresholds includes: comparing a first parameter to a first threshold (e.g., band, bandwidth, etc.) to determine the waveform type.

In an eighteenth aspect, alone or in combination with one or more of the above aspects, the waveform type is set by the network or region, and the UE 115 further: receives a message indicating waveform configuration information which indicates the waveform; and stores the waveform configuration information in the memory.

In a nineteenth aspect, alone or in combination with one or more of the above aspects, the UE 115 further: determines the waveform type for at least a portion of the RACH response based on a waveform of a received SIB1 message.

In a twentieth aspect, alone or in combination with one or more of the above aspects, the UE 115 further: a first waveform of a PDCCH of the RACH response, a second waveform of a PDSCH of the RACH response, or both are determined based on (e.g., the same as) a third waveform of the PDCCH of a received SIB1 message.

In a twenty-first aspect, alone or in combination with one or more of the above aspects, a first waveform of a PDCCH of the RACH response, a second waveform of a PDSCH of the RACH response, or both are determined based on (e.g., the same as) a third waveform of the PDSCH of a received SIB1 message.

In a twenty-second aspect, alone or in combination with one or more of the above aspects, the UE 115 further: determines the waveform type of the RACH response based on a waveform indicator of a received SIB1 message.

In a twenty-third aspect, alone or in combination with one or more of the above aspects, the waveform indicator of the received SIB1 message indicates a first waveform of a PDCCH of the RACH response and a second waveform of the PDSCH of the RACH response, and wherein the first waveform of a PDCCH of the RACH response is the same as the second waveform of the PDSCH of the RACH response.

In a twenty-fourth aspect, alone or in combination with one or more of the above aspects, the waveform indicator of the received SIB1 message indicates a first waveform of a PDCCH of the RACH response and a second waveform of the PDSCH of the RACH response, and wherein the first waveform of the PDCCH of the RACH response is different from the second waveform of the PDSCH of the RACH response.

In a twenty-fifth aspect, alone or in combination with one or more of the above aspects, the RACH response includes a first waveform of a PDCCH of the RACH response and a second waveform of the PDSCH of the RACH response, and the UE 115 further: determines the second waveform of the PDSCH of the RACH response based on the PDCCH of the RACH response (e.g., an indicator thereof).

In a twenty-sixth aspect, alone or in combination with one or more of the above aspects, the first waveform of the PDCCH of the RACH response is the same as the second waveform of the PDSCH of the RACH response, and wherein determining the second waveform of the PDSCH of the RACH response based on the PDCCH of the RACH response includes: determining, by the wireless communication device, the second waveform of the PDSCH of the RACH response based on the first waveform of the PDCCH of the RACH response.

In a twenty-seventh aspect, alone or in combination with one or more of the above aspects, the first waveform of the PDCCH of the RACH response is different from the second waveform of the PDSCH of the RACH response, and wherein determining the second waveform of the PDSCH of the RACH response based on the PDCCH of the RACH response includes: determining, by the wireless communication device, the second waveform of the PDSCH of the RACH response based on a waveform indicator of the PDCCH of the RACH response.

In a twenty-eighth aspect, alone or in combination with one or more of the above aspects, the UE 115 further: determines the first waveform of the PDCCH of the RACH response based on the SIB1 message.

Accordingly, wireless communication devices may perform enhanced RACH operations and dynamic waveform type indication operations for wireless communication devices. By performing enhanced RACH operations or dynamic waveform type indication network performance can be increased by increasing throughput and reducing overhead and latency.

Figure 9:
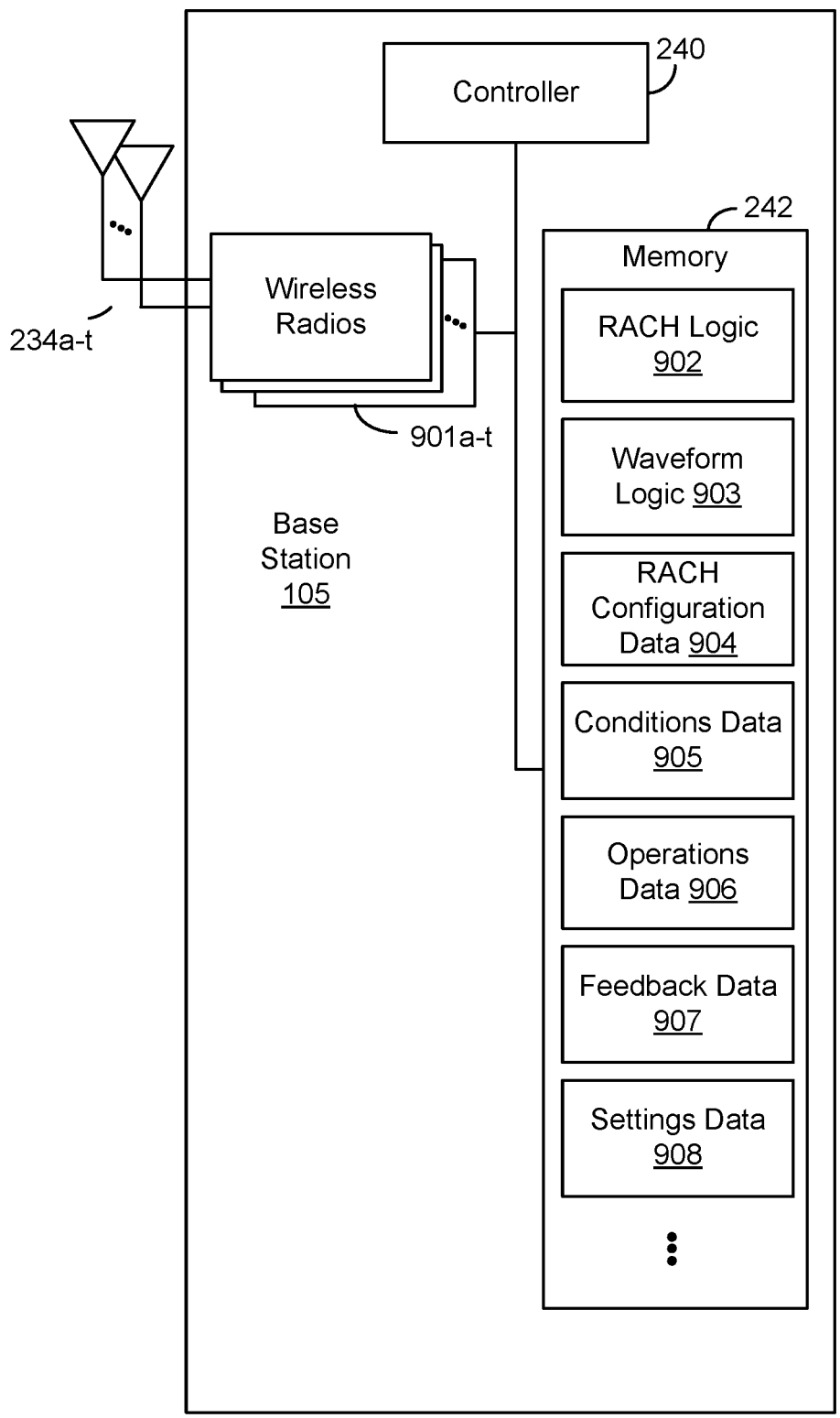
FIG. 9 is a block diagram of an example base station that supports RACH message waveform indication according to one or more aspects.

FIG. 7 is a flow diagram illustrating example blocks executed wireless communication device (e.g., a UE or base station) configured according to an aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 901a-t and antennas 234a-t. Wireless radios 901a-t includes various components and hardware, as illustrated in FIG. 2 for base station 105, including modulator/demodulators 232a-r, MIMO detector 236, receive processor 238, transmit processor 220, and TX MIMO processor 230. As illustrated in the example of FIG. 9, memory 282 stores RACH logic 902, waveform logic 903, RACH configuration data 904, conditions data 905, operations data 906, feedback data 907, and settings data 908.

At block 700, a wireless communication device, such as a network device (e.g., a base station 105), receives a random access control channel (RACH) request message. For example, the base station 105 receives the RACH request transmission 454 of FIG. 4 or the RACH request message of FIG. 5 as described with reference to FIGS. 4 and 5. To illustrate, a receiver (e.g., receive processor 258 or receiver 436) of the base station 105 receives the RACH request transmission 454, including the RACH configuration information 406, via wireless radios 901a-t and antennas 234a-t. The RACH request transmission 454 may include or correspond to MsgA and include a RACH preamble and a scheduled data transmission, as described with reference to FIGS. 3-5. The base station 105 may optionally determine a waveform type of the RACH request message based on the RACH request or a prior system message, such as by an indicator included therein or based on a waveform type of such message. Additionally, or alternatively, the base station 105 may determine the waveform type on operating conditions, such as a frequency range, frequency band, channel, bandwidth, etc., channel conditions, such as congestion, signal strength, channel quality, etc., or a combination thereof.

At block 701, the wireless communication device transmits a RACH response message based on the RACH request message, wherein a waveform type of RACH response messages is dynamic, and wherein the waveform type of the RACH response message is determined by the wireless communication device. For example, the base station 105 transmits the RACH response transmission 456 of FIG. 4 or the RACH response message of FIG. 5, as described with reference to FIGS. 4 and 5. To illustrate, a transmitter (e.g., transmit processor 220/TX MIMO processor 230 or transmitter 434) of the base station 105 transmits the RACH response transmission 456 via wireless radios 901a-t and antennas 234a-t for completing a two-step RACH procedure. The RACH response transmission 456 may include or correspond to MsgB and include a PDCCH and a PDSCH, as described with reference to FIGS. 3-5. The base station 105 may determine a waveform type of the RACH response message based on the RACH request, the RACH response, or a prior system message, such as by an indicator included therein or based on a waveform type of such message. Additionally, or alternatively, the base station 105 may determine the waveform type on operating conditions, such as a frequency range, frequency band, channel, bandwidth, etc., channel conditions, such as congestion, signal strength, channel quality, etc., or a combination thereof. Receiving the RACH request message and transmitting the RACH response message comprise a two-step RACH procedure.

The wireless communication device (e.g., such as a UE or base station) may execute additional blocks (or the wireless communication device may be configured further perform additional operations) in other implementations. For example, the wireless communication device may perform one or more operations described above. As another example, the wireless communication device may perform one or more aspects as described with reference to FIGS. 3-8.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   transmitting, by a wireless communication device, a random access control channel (RACH) request message;
   determine, by the wireless communication device, a waveform type of a RACH response message for the RACH request message based on a received system information block number one (SIB1) message, wherein the received SIB1 message indicates at least a first waveform type of a physical downlink control channel (PDCCH) of the RACH response message; and
   receiving, by the wireless communication device, the RACH response message based on the RACH request message, wherein the waveform type of the RACH response message is adjustable from a waveform type of the RACH request message, wherein a second waveform type of a physical downlink shared channel (PDSCH) of the RACH response message is determined by the wireless communication device, and wherein transmitting the RACH request message and receiving the RACH response message comprise a two-step RACH procedure.

2. The method of claim 1, further comprising:
   processing, by the wireless communication device, waveforms of the RACH response message based on the determined waveform type of the RACH response message.

3. The method of claim 1, wherein determining the waveform type of the RACH response message based on the received SIB1 message includes:
   determining the waveform type of at least a portion of the RACH response message based on network settings, a waveform indicator of the SIB1 message, the RACH response message, or a combination thereof.

4. The method of claim 1, further comprising:
   receiving, by the wireless communication device, a higher layer message indicating RACH configuration information, wherein the higher layer message comprises a synchronization signal block (SSB) message, a system information block (SIB) message, a reference signal (RS) message, or a radio resource control (RRC) message.

5. The method of claim 1, further comprising:
transmitting, by the wireless communication device, a feedback transmission based on and responsive to the RACH response message.

6. The method of claim 5, wherein the feedback transmission comprises a physical uplink control channel (PUCCH) transmission, and wherein the feedback transmission includes hybrid automatic repeat request (HARQ) feedback corresponding to the RACH response message.

7. The method of claim 5, further comprising:
switching, by the wireless communication device, from an idle or standby mode to a connected mode based on the feedback transmission; and
operating, by the wireless communication device, in the connected mode.

8. The method of claim 1, wherein a waveform indicator of the received SIB1 message indicates the first waveform type of the PDCCH of the RACH response message and indicates the second waveform type of the PDSCH of the RACH response message.

9. The method of claim 1, wherein the first waveform type of the PDCCH of the RACH response message is determined based on a waveform type of the SIB1 message.

10. The method of claim 1, further comprising:
determining, by the wireless communication device, the second waveform type of the PDSCH of the RACH response message based on a waveform indicator of the received SIB1 message, a second waveform indicator of the received SIB1 message, or the first waveform type of the PDCCH of the RACH response message.

11. An apparatus for wireless communication comprising:
one or more processors; and
one or more memories coupled to the one or more processors, the one or more memories storing instructions which when executed by the one or more processors cause the one or more processors to:
transmit a random access control channel (RACH) request message;
determine a waveform type of a RACH response message for the RACH request message based on a received system information block number one (SIB1) message, wherein the received SIB1 message indicates at least a first waveform type of a physical downlink control channel (PDCCH) of the RACH response message; and
receive a RACH response message based on the RACH request message, wherein the waveform type of the RACH response message is adjustable from the waveform type of the RACH request message, wherein a second waveform type of a physical downlink shared channel (PDSCH) of the RACH response message is determined by the apparatus, and wherein transmitting the RACH request message and receiving the RACH response message comprise a two-step RACH procedure.

12. The apparatus of claim 11, wherein the instructions when executed by the one or more processors further cause the one or more processors to:
determine the first waveform type of the PDCCH of the RACH response message based on a waveform indicator of the SIB1 message.

13. The apparatus of claim 12, wherein the waveform indicator of the received SIB1 message further indicates the second waveform type of the PDSCH of the RACH response message, and wherein the first waveform type of the PDCCH of the RACH response message is the same as the second waveform type of the PDSCH of the RACH response message.

14. The apparatus of claim 12, wherein the instructions when executed by the one or more processors further cause the one or more processors to:
determine the second waveform type of the PDSCH of the RACH response message based on the waveform indicator of the SIB1 message.

15. The apparatus of claim 11, wherein the RACH response message includes the second waveform type of the PDSCH of the RACH response message, and wherein the instructions when executed by the one or more processors further cause the one or more processors to:
determine the second waveform type of the PDSCH of the RACH response message based on the PDCCH of the RACH response message.

16. The apparatus of claim 15, wherein the first waveform type of the PDCCH of the RACH response message is the same as the second waveform type of the PDSCH of the RACH response message, and wherein to determine the second waveform type of the PDSCH of the RACH response message based on the PDCCH of the RACH response message includes:
to determine the second waveform type of the PDSCH of the RACH response message based on the first waveform type of the PDCCH of the RACH response message.

17. The apparatus of claim 15, wherein the instructions when executed by the one or more processors further cause the one or more processors to:
determine the first waveform type of the PDCCH of the RACH response message based on a waveform type of the SIB1 message or a waveform indicator of the SIB1 message.

18. The apparatus of claim 11, wherein the instructions when executed by the one or more processors further cause the one or more processors to:
determine the first waveform type of the PDCCH of the RACH response message based on a waveform type of the SIB1 message.

19. The apparatus of claim 11, wherein the instructions when executed by the one or more processors further cause the one or more processors to:
determine the second waveform type of the PDSCH of the RACH response message based on a waveform indicator of the received SIB1 message, a second waveform indicator of the received SIB1 message, or the first waveform type of the PDCCH of the RACH response message.

20. A method of wireless communication comprising:
receiving, by a wireless communication device, a random access control channel (RACH) request message;
determine, by the wireless communication device, a waveform type of a RACH response message for the RACH request message based on a received system information block number one (SIB1) message, wherein the received SIB1 message indicates at least a first waveform type of a physical downlink control channel (PDCCH) of the RACH response message; and
transmitting, by the wireless communication device, the RACH response message based on the RACH request message, wherein the waveform type of the RACH response message is adjustable from a waveform type of the RACH request message, and wherein a second waveform type of a physical downlink shared channel (PDSCH) of the RACH response message is determined by the wireless communication device, and wherein receiving the RACH request message and transmitting the RACH response message comprise a two-step RACH procedure.

21. The method of claim 20, wherein the RACH request comprises a message A transmission and includes a Message A preamble and a Message A payload, wherein the RACH response message comprises a Message B transmission and includes a Message B PDCCH and a Message B PDSCH.

22. The method of claim 21, wherein the Message B PDCCH comprises the first waveform type and the Message B PDSCH comprises the second waveform type.

23. The method of claim 20, wherein the two-step RACH procedure is performed in response to a transition from a radio resource control (RRC) IDLE/INACTIVE state to a RRC CONNECTED state, a small data transmission in the RRC IDLE/INACTIVE state, a handover in the RRC CONNECTED state, or an uplink synchronization loss in the RRC CONNECTED state.

24. The method of claim 20, wherein the waveform type of the RACH response message comprises a frequency-domain waveform.

25. The method of claim 20, wherein the waveform type of the RACH response message comprises a time-domain waveform.

26. An apparatus for wireless communication comprising:
one or more processors; and
one or more memories coupled to the one or more processors, the one or more memories storing instructions which when executed by the one or more processors cause the one or more processors to:
receive a random access control channel (RACH) request message;
determine a waveform type of a RACH response message for the RACH request message based on a received system information block number one (SIB1) message, wherein the received SIB1 message indicates at least a first waveform type of a physical downlink control channel (PDCCH) of the RACH response message; and
transmit the RACH response message based on the RACH request message, wherein the waveform type of the RACH response message is adjustable from a waveform type of the RACH request message, and wherein a second waveform type of a physical downlink shared channel (PDSCH) of the RACH response message is determined by the apparatus, and wherein receiving the RACH request message and transmitting the RACH response message comprise a two-step RACH procedure.

27. The apparatus of claim 26, wherein the waveform type of the RACH response message comprises a single carrier waveform.

28. The apparatus of claim 27, wherein the single carrier waveform comprises a discrete Fourier transform spread orthogonal frequency division multiplexing (DFT-s-OFDM) waveform or a Single-Carrier Quadrature Amplitude Modulation (SC-QAM) waveform.

29. The apparatus of claim 26, wherein the waveform type of the RACH response message comprises a multi-carrier waveform.

30. The apparatus of claim 29, wherein the multi-carrier waveform comprises a cyclic prefix (CP) orthogonal frequency division multiplexing (CP OFDM) waveform.

\* \* \* \* \*